United States Patent
Suzuki et al.

(10) Patent No.: US 12,237,784 B2
(45) Date of Patent: Feb. 25, 2025

(54) MOTOR CONTROL DEVICE

(71) Applicants: Hitachi Astemo, Ltd., Hitachinaka (JP); HONDA MOTOR CO., LTD., Tokyo (JP)

(72) Inventors: Takami Suzuki, Hitachinaka (JP); Kohei Onishi, Hitachinaka (JP); Tomoyuki Dansako, Hitachinaka (JP); Tomofumi Hayashi, Tokyo (JP); Satoshi Fujishiro, Tokyo (JP); Yoshihiro Ito, Tokyo (JP)

(73) Assignees: HITACHI ASTEMO, LTD., Hitachinaka (JP); HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 18/191,416

(22) Filed: Mar. 28, 2023

(65) Prior Publication Data

US 2023/0308035 A1    Sep. 28, 2023

(30) Foreign Application Priority Data

Mar. 28, 2022 (JP) .................................. 2022-051824

(51) Int. Cl.
    *H02P 21/14*      (2016.01)
    *H02P 21/00*      (2016.01)
    *H02P 21/20*      (2016.01)
    *H02P 21/22*      (2016.01)

(52) U.S. Cl.
CPC ........ *H02P 21/141* (2013.01); *H02P 21/0089* (2013.01); *H02P 21/20* (2016.02); *H02P 21/22* (2016.02)

(58) Field of Classification Search
CPC ...... H02P 21/00; H02P 21/0089; H02P 21/22; H02P 21/20; H02P 21/141

USPC ..................................................... 318/400.02
See application file for complete search history.

(56) References Cited

U.S. PATENT DOCUMENTS 5,334,923 A * 8/1994 Lorenz .................... H02P 21/18
                                                                              318/807

FOREIGN PATENT DOCUMENTS

JP      2018198479 A     12/2018

OTHER PUBLICATIONS

Iijima Tomokuni et al. (JP H10327591 A) Motor Controller Date Published Dec. 8, 1998 (Year: 1998).*
(KR 19990069920 A) Speed Sensorless Vector Controller Using High Frequency Injection in Induction Motors Date Published Sep. 6, 1999 (Year: 1999).*

(Continued)

*Primary Examiner* — Jorge L Carrasquillo
(74) *Attorney, Agent, or Firm* — CANTOR COLBURN LLP

(57) ABSTRACT

A motor control device of the present invention includes a magnetic-flux command value generator and a current-command value generator. The magnetic-flux command value generator is configured to generate a magnetic-flux command value based on a torque-command value. The current-command value generator is configured to generate a current-command value on the basis of the magnetic-flux command value. The magnetic-flux command value generator includes a magnetic-flux command calculator, a feedback-value calculator, a magnetic-flux compensation value calculator, a magnetic-flux command value calculator, and a control-gain changer.

5 Claims, 4 Drawing Sheets

(56) References Cited

OTHER PUBLICATIONS (KR 20040019323 A) Method and Device for Controlling Currents of Synchronous Motor Date Published Mar. 5, 2004 (Year: 2004).*
Imm et al. (CN 105610380 A) Six Mode Control Method And Device of Motor Date Published May 25, 2016 (Year: 2016).*

* cited by examiner

MOTOR CONTROL DEVICE

CROSS-REFERENCE TO RELATED APPLICATION

The present invention claims priority under 35 U.S.C. § 119 to Japanese Application, 2022-051824, filed on Mar. 28, 2022, the entire contents of which being incorporated herein by reference.

BACKGROUND OF THE INVENTION

Field of the Invention

The present invention relates to a motor control device.

Description of Related Art

A motor control device that vector-controls an AC motor on the basis of a d-axis and a q-axis is known. A motor control device that performs such vector control generates a d-axis current-command value id* and a q-axis current-command value iq*. The motor control device controls driving of an AC motor on the basis of the d-axis current-command value id* and the q-axis current-command value iq*. For example, Japanese Unexamined Patent Application, First Publication No. 2018-198479 (hereinbelow, referred to as Patent Literature 1) discloses a control device for a synchronous electric motor that performs vector control as described above. The control device disclosed in Patent Literature 1 generates a magnetic-flux command value from a torque-command value. Further, this control device generates the current-command values (the d-axis current-command value id* and the q-axis current-command value iq*) from the magnetic-flux command value.

It is conceivable to perform magnetic-flux feedback control in the motor control device as described above. In the magnetic-flux feedback control, a magnetic-flux feedback value is calculated on the basis of a state quantity of a motor to be controlled, a magnetic-flux compensation value is calculated using the magnetic-flux feedback value, and furthermore, a magnetic-flux command value is calculated using the magnetic-flux compensation value. However, if the control gain used to calculate the magnetic-flux compensation value is set to a fixed value, a case in which the magnetic-flux command value according to a change in state of the motor cannot be calculated, and vibration or the like occurs in the motor or the like is conceivable.

SUMMARY OF THE INVENTION

The present invention has been made in view of the above-described problems, and an objective of the present invention is to enable calculation of a magnetic-flux command value according to a change in state of a motor in a motor control device that controls the motor by magnetic-flux feedback control.

In order to solve the above-described problems, the present invention employs the following aspects.

A motor control device according to a first aspect includes a magnetic-flux command value generator configured to generate a magnetic-flux command value based on a torque-command value, and a current-command value generator configured to generate a current-command value on the basis of the magnetic-flux command value. The magnetic-flux command value generator described above includes a magnetic-flux command calculator configured to calculate a pre-compensation magnetic-flux command value on the basis of the torque-command value, a feedback-value calculator configured to calculate a magnetic-flux feedback value on the basis of a state quantity of a motor, a magnetic-flux compensation value calculator configured to calculate a magnetic-flux compensation value using a control gain on the basis of a deviation between the pre-compensation magnetic-flux command value and the magnetic-flux feedback value, a magnetic-flux command value calculator configured to calculate the magnetic-flux command value from the pre-compensation magnetic-flux command value on the basis of the magnetic-flux compensation value, and a control-gain changer configured to change the control gain on the basis of the state quantity.

A second aspect, in the above-described first aspect, may employ a configuration in which the control-gain changer configured to lower the control gain when field-weakening control is performed compared with that when the field-weakening control is not performed.

A third aspect, in the above-described second aspect, may employ a configuration in which the state quantity is a rotation speed of the motor, and the control-gain changer configured to determine whether or not the field-weakening control is to be performed on the basis of a first rotation speed range indicating a rotation speed range within which the field-weakening control set in advance is performed.

A fourth aspect, in the above-described third aspect, may employ a configuration in which the control-gain changer configured to determine whether or not the field-weakening control is to be performed on the basis of the rotation speed, the torque-command value, and a voltage of a power supply connected to the motor when the rotation speed of the motor is outside of the first rotation speed range.

A fifth aspect, in any one of the above-described second to fourth aspects, may employ a configuration in which a threshold value for determining whether or not the field-weakening control is to be performed has hysteresis.

According to the aspects of the present invention, the magnetic-flux command value generator includes the magnetic-flux compensation value calculator configured to calculate the magnetic-flux compensation value using a control gain on the basis of a deviation between the pre-compensation magnetic-flux command value and the magnetic-flux feedback value. The control gain used in the magnetic-flux compensation value calculator is changed on the basis of a state quantity of the motor. Therefore, according to the aspects of the present invention, it is possible to calculate a magnetic-flux command value according to a change in state of a motor in a motor control device that controls the motor by magnetic-flux feedback control.

DETAILED DESCRIPTION OF THE INVENTION

One embodiment of a motor control device according to the present invention will be described below with reference to the drawings.

Figure 1:
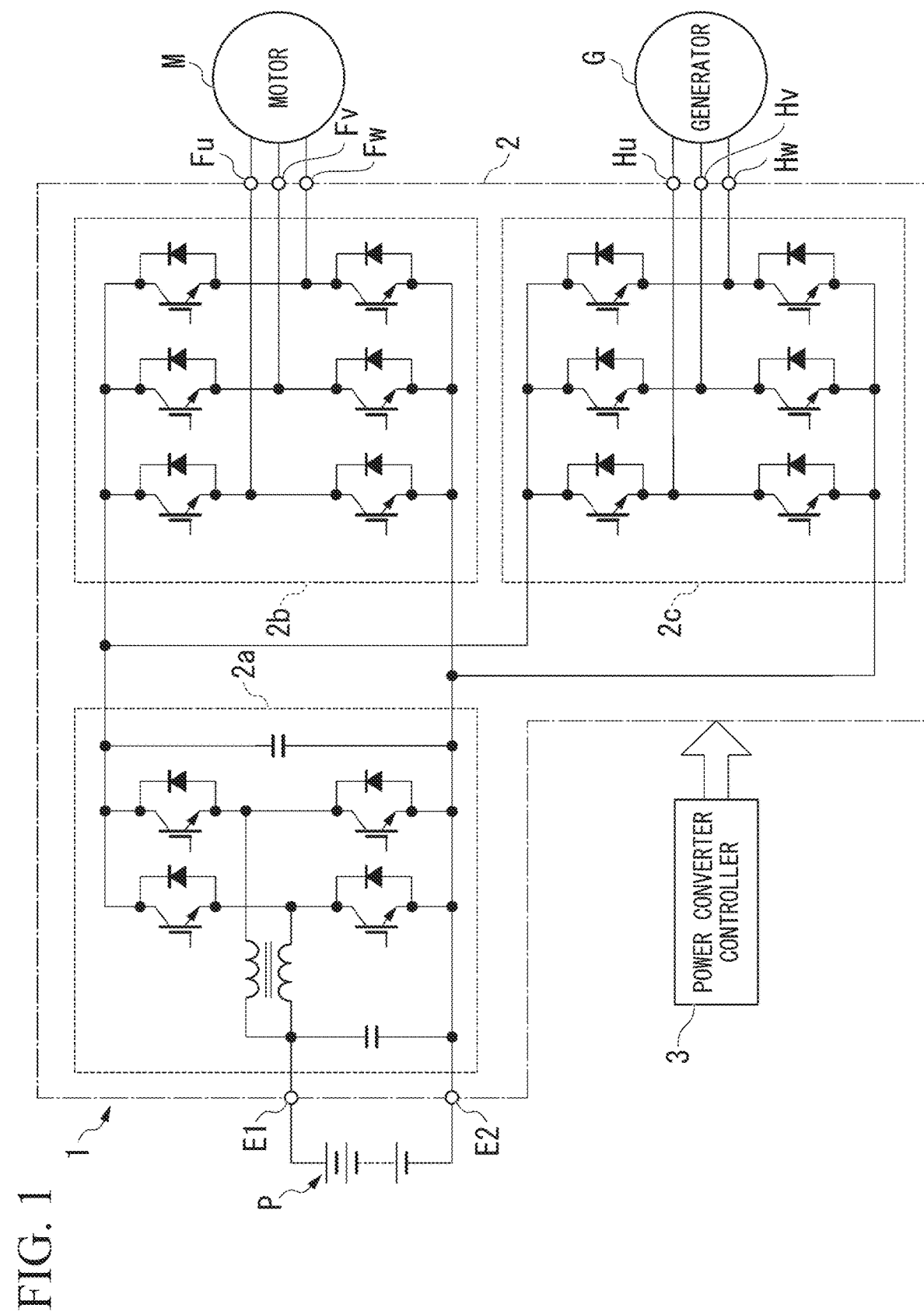
FIG. 1 is a circuit diagram schematically showing a schematic configuration of a control device that functions as a motor control device in one embodiment of the present invention.

FIG. 1 is a circuit diagram schematically showing a schematic configuration of a control device 1 that functions as a motor control device of the present embodiment. As shown in FIG. 1, the control device 1 includes a power converter 2 and a power converter controller 3.

As shown in FIG. 1, the power converter 2 includes a buck-boost converter 2a, a drive inverter 2b, and a power generation inverter 2c. The buck-boost converter 2a steps up a DC voltage output from a battery P (power supply) at a predetermined step-up ratio. Also, the buck-boost converter 2a steps down a DC voltage output from the drive inverter 2b or the power generation inverter 2c at a predetermined step-down ratio. Such a buck-boost converter 2a includes, for example, a plurality of capacitors, a transformer, and a plurality of insulated gate bipolar transistors (IGBTs) for transformation as shown in FIG. 1.

Such a buck-boost converter 2a is a power circuit referred to as a so-called magnetically coupled interleaved chopper circuit. The buck-boost converter 2a selectively performs a step-up operation and a step-down operation. The step-up operation is an operation of stepping up the DC power input from the battery P via a pair of battery terminals and outputting the stepped-up DC power to the drive inverter 2b. The step-down operation is an operation of stepping down the DC power input from the drive inverter 2b or the power generation inverter 2c and outputting the stepped-down DC power to the battery P via the pair of battery terminals. That is, the buck-boost converter 2a is a power conversion circuit that bidirectionally inputs and outputs DC power between the battery P and the drive inverter 2b or between the battery P and the power generation inverter 2c.

The drive inverter 2b converts the DC power output from the battery P into AC power on the basis of a pulse width modulation (PWM) signal from the power converter controller 3, and supplies the AC power to a motor M. Also, the drive inverter 2b converts the AC power output from the motor M into DC power on the basis of the PWM signal from the power converter controller 3 and supplies the DC power to the buck-boost converter 2a. Such a drive inverter 2b has three switching legs as shown in FIG. 1. The drive inverter 2b includes a total of six drive IGBTs.

Such a drive inverter 2b has three (a plurality of) switching legs corresponding to the number of phases of the motor M. The drive inverter 2b is a power conversion circuit that selectively performs a power running operation and a regenerative operation. The power running operation is an operation of converting the DC power input from the buck-boost converter 2a into three-phase AC power and outputting the three-phase AC power to the motor M via three motor terminals. The regenerative operation is an operation of converting the three-phase AC power input from the motor M via the three motor terminals into DC power and outputting the DC power to the buck-boost converter 2a. That is, the drive inverter 2b is a power circuit that mutually converts the DC power and the three-phase AC power between the buck-boost converter 2a and the motor M.

The power generation inverter 2c converts the AC power output from a generator G into DC power on the basis of the PWM signal from the power converter controller 3 and supplies the DC power to the buck-boost converter 2a. Such a power generation inverter 2c also has three switching legs similarly to the drive inverter 2b. The power generation inverter 2c includes a total of six drive IGBTs.

Such a power generation inverter 2c has three (a plurality of) switching legs corresponding to the number of phases of the generator G. The power generation inverter 2c is a power conversion circuit that converts the three-phase AC power input from the generator G via three generator terminals into DC power and outputs the DC power to the buck-boost converter 2a. That is, the power generation inverter 2c is a power circuit that mutually converts the DC power and the three-phase AC power between the buck-boost converter 2a and the generator G.

The battery P, the motor M, and the generator G are connected to the power converter 2 as shown in the figure. The power converter 2 includes a pair of battery terminals (a positive battery terminal E1 and a negative battery terminal E2) to which the battery P is connected as terminals for external connection. Also, the power converter 2 includes the three motor terminals (a U-phase motor terminal Fu, a V-phase motor terminal Fv, and a W-phase motor terminal Fw) to which the motor M is connected. Also, the power converter 2 includes the three generator terminals (a U-phase generator terminal Hu, a V-phase generator terminal Hv, and a W-phase generator terminal Hw) to which the generator G is connected.

The control device 1 including such a power converter 2 is an electrical device provided in an electric vehicle such as a hybrid vehicle or an electric automobile. The control device 1 controls the motor M serving as a rotary electric machine, and controls charging of the battery P with AC power generated by the generator G. That is, the control device 1 performs drive control of the motor M based on the output of the battery P (battery power), and charge control of the battery P based on the output power (generated power) of the generator G.

Further, the control device 1 can also have a configuration in which the power converter 2 does not include the power generation inverter 2c, and the generator G is not connected to the power converter 2. In this case, the control device 1 performs drive control of the motor M based on the output of the battery P (battery power) without performing charging control of the battery P based on the output power (generated power) of the generator G.

Here, a positive electrode of the battery P is connected to the positive battery terminal E1 as shown in the figure. A negative electrode of the battery P is connected to the negative battery terminal E2. The battery P is a secondary battery such as a lithium ion battery. The battery P discharges DC power to the control device 1 and is charged with DC power via the control device 1.

The motor M is a three-phase electric motor in which the number of phases is "3". The motor M is a load of the drive inverter 2b. In the motor M, a U-phase input terminal is connected to the U-phase motor terminal Fu. A V-phase input terminal is connected to the V-phase motor terminal Fv. A W-phase input terminal is connected to the W-phase motor terminal Fw. In such a motor M, a rotating shaft (drive shaft) is connected to a wheel of an electric vehicle. The motor M rotationally drives the wheel by applying rotational power to the wheel.

The generator G is a three-phase generator. In the generator G, a U-phase output terminal is connected to the U-phase generator terminal Hu. A V-phase output terminal is connected to the V-phase generator terminal Hv. A W-phase output terminal is connected to the W-phase generator terminal Hw. The generator G is connected to an output shaft of a power source such as an engine mounted on an electric vehicle. The generator G outputs the three-phase AC power to the control device 1.

The power converter controller 3 includes a gate driver and an electronic control unit (ECU). The gate driver is a circuit that generates gate signals on the basis of various duty command values (a transformation-duty command value, a drive-duty command value, and a power-generation-duty command value) input from the ECU. For example, the gate driver generates a gate signal to be supplied to the buck-boost converter 2a on the basis of the transformation-duty command value input from the ECU. Also, the gate driver generates a gate signal to be supplied to the drive inverter 2b on the basis of the drive-duty command value input from the ECU. Also, the gate driver generates a gate signal to be supplied to the power generation inverter 2c on the basis of the power-generation-duty command value input from the ECU.

The ECU is a control circuit that performs predetermined control processing on the basis of a program stored in advance. The ECU outputs various duty command values (the transformation-duty command value, the drive-duty command value, and the power-generation-duty command value) generated on the basis of the above-described control processing to the gate driver. Such an ECU performs drive control of the motor M and charge control of the battery P via the power converter 2 and the gate driver. That is, the ECU generates various duty command values (the transformation-duty command value, the drive-duty command value, and the power-generation-duty command value) relating to the buck-boost converter 2a, the drive inverter 2b, and the power generation inverter 2c on the basis of a detection value of a voltage sensor (voltage detection value), a detection value of a current sensor (current detection value), operation information of the electric vehicle, and the like, in which the voltage sensor and the current sensor are collaterally provided in the buck-boost converter 2a, the drive inverter 2b, and the power generation inverter 2c.

Figure 2:
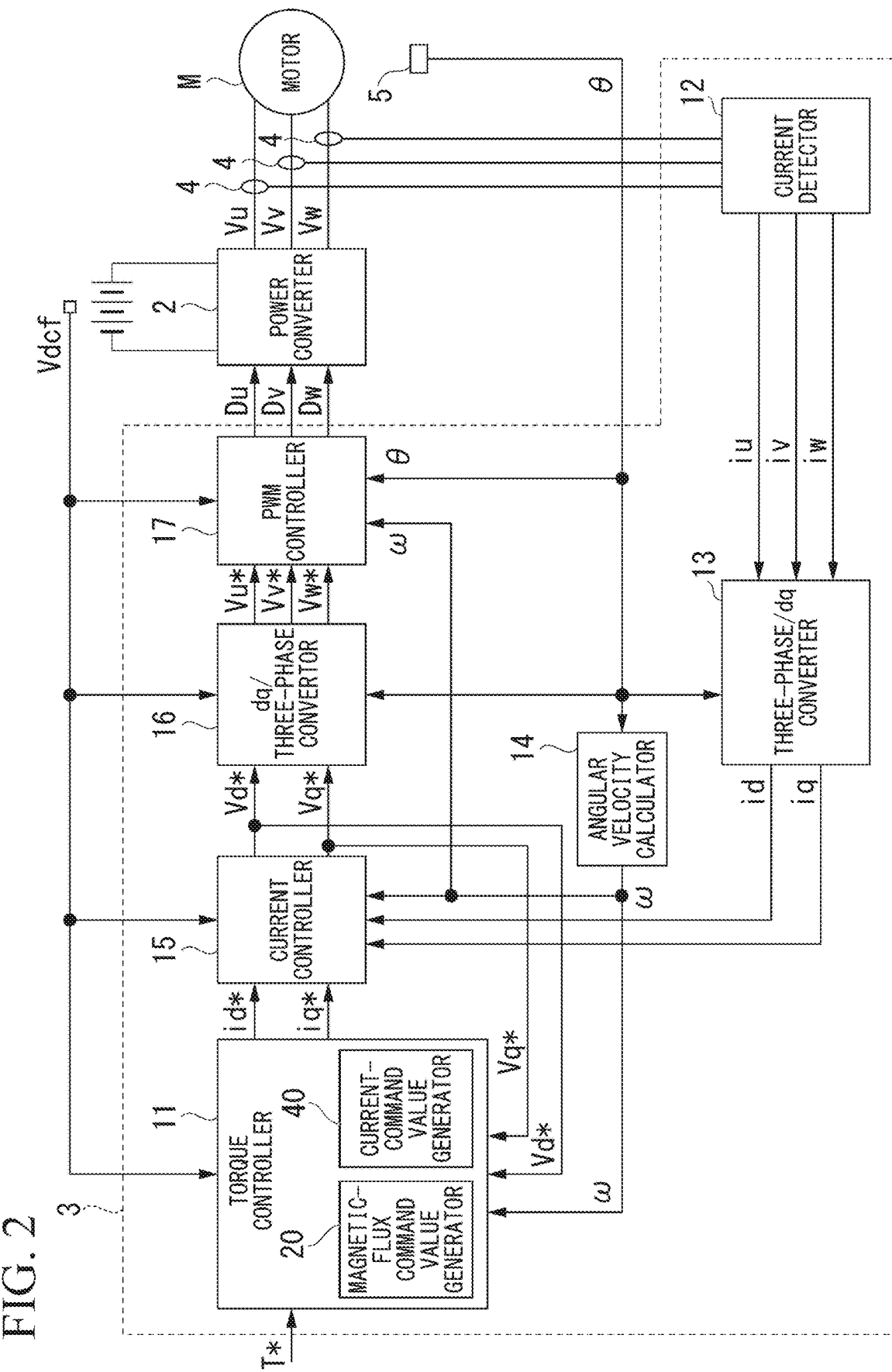
FIG. 2 is a block diagram showing a functional configuration of a power converter controller as the motor control device.

FIG. 2 is a block diagram showing a functional configuration of the power converter controller 3 as the motor control device. The control device 1 includes a current sensor 4 and a rotation angle sensor 5 as shown in FIG. 2 in addition to the power converter 2 and the power converter controller 3.

The current sensor 4 detects each phase current between the motor M and the power converter 2. The current sensor 4 outputs a detection result thereof to the power converter controller 3. Further, a plurality of current sensors 4 may be provided between the power converter 2 and the motor M or may be provided inside the power converter 2. The current sensor 4 is not particularly limited as long as it is configured to detect a phase current of each phase. The current sensor 4 includes, for example, a current transformer (CT) having a transformer and a Hall element. Also, the current sensor 4 may be a shunt resistor.

The rotation angle sensor 5 detects a rotation angle of the motor M. The rotation angle of the motor M is an electrical angle of the above-described motor from a predetermined reference rotation position. The rotation angle sensor 5 outputs a detection signal indicating the detected rotation angle to the power converter controller 3. For example, the rotation angle sensor 5 may have a resolver. Further, a rotation speed of the motor M (motor rotation speed) can be calculated on the basis of the detection signal output from the rotation angle sensor 5. That is, the rotation angle sensor 5 outputs the detection signal including the motor rotation speed as information.

The power converter controller 3 includes a torque controller 11, a current detector 12, a three-phase/dq converter 13, an angular velocity calculator 14, a current controller 15, a dq/three-phase convertor 16, and a PWM controller 17 as functional units embodied by, for example, the above-described gate driver, ECU, and the like.

The torque controller 11 acquires a torque-command value T* from the outside. On the basis of the torque-command value T*, the torque controller 11 generates a d-axis current-command value id* which is a target value of a d-axis current of the motor M, and a q-axis current-command value iq* which is a target value of a q-axis current of the motor M. Also, the torque controller 11 outputs the generated d-axis current-command value id* and q-axis current-command value iq* to the current controller 15.

In the present embodiment, the torque controller 11 includes a magnetic-flux command value generator 20 that generates a magnetic-flux command value based on the torque-command value T*, and a current-command value generator 40 that generates current-command values (the d-axis current-command value id* and the q-axis current-command value iq*) on the basis of the magnetic-flux command value.

Figure 3:
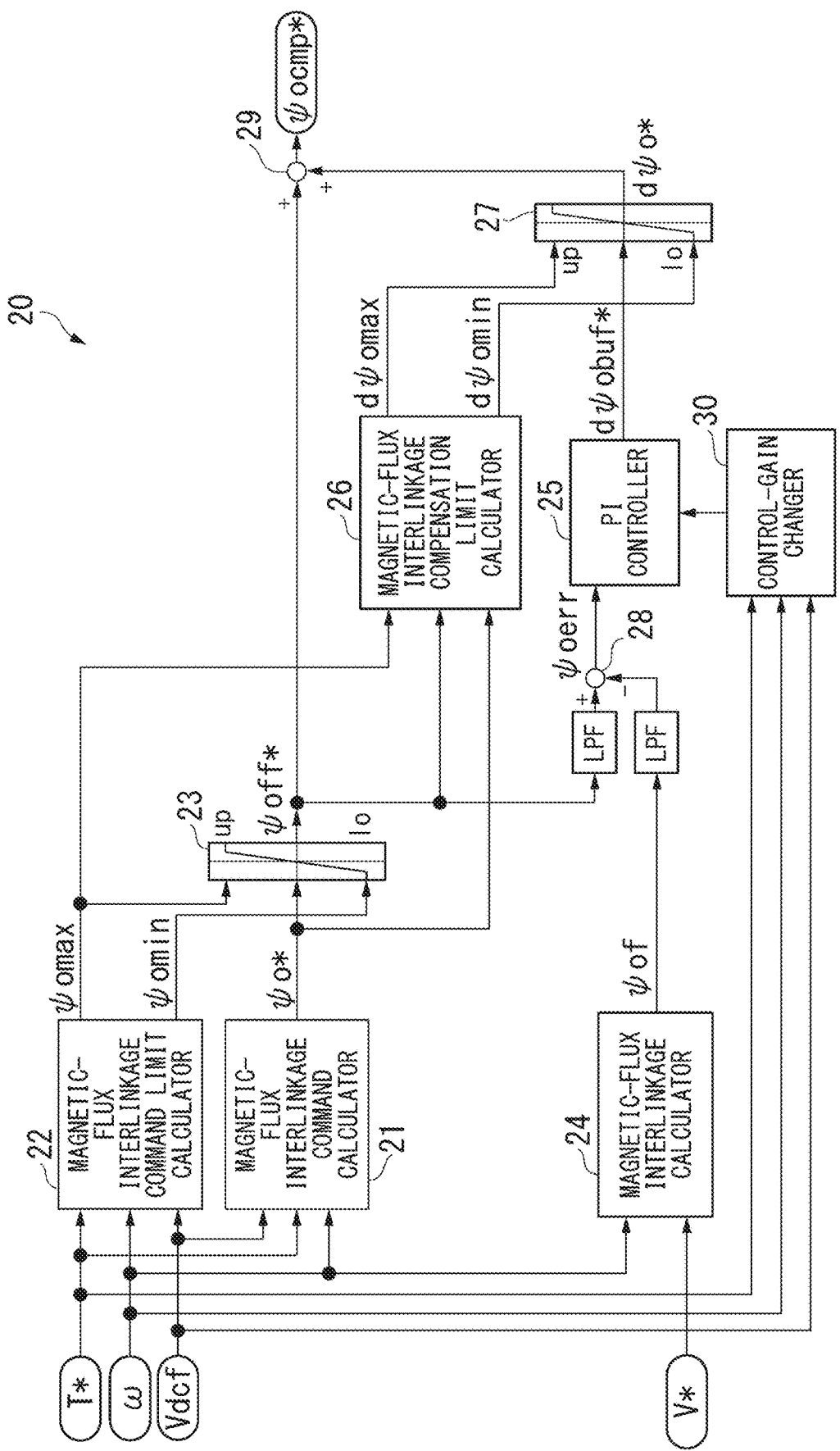
FIG. 3 is a block diagram of a magnetic-flux command value generator of the control device in one embodiment of the present invention.

FIG. 3 is a block diagram of the magnetic-flux command value generator 20. As shown in the figure, the magnetic-flux command value generator 20 includes a magnetic-flux interlinkage command calculator 21 (magnetic-flux command calculator), a magnetic-flux interlinkage command limit calculator 22, a magnetic-flux interlinkage command limit limiter 23, a magnetic-flux interlinkage calculator 24 (feedback-value calculator), a PI controller 25 (magnetic-flux compensation value calculator), a magnetic-flux interlinkage compensation limit calculator 26 (limit calculator), a magnetic-flux interlinkage compensation limit limiter 27 (limit limiter), a subtractor 28, an adder 29, and a control-gain changer 30.

The magnetic-flux interlinkage command calculator 21 calculates a pre-compensation magnetic-flux interlinkage command value $\Psi o^*$ (pre-compensation magnetic-flux command value) on the basis of the torque-command value T*. For example, an angular velocity ω from the angular velocity calculator 14 shown in FIG. 2 is input to the magnetic-flux interlinkage command calculator 21. Also, a DC bus voltage Vdcf (voltage of the battery P) is input to the magnetic-flux interlinkage command calculator 21. For example, the magnetic-flux interlinkage command calculator 21 obtains a modulation factor coefficient used in the power converter 2 on the basis of a map for obtaining the modulation factor coefficient using the torque-command value T*, the angular velocity ω, and the DC bus voltage Vdcf as parameters. Further, the magnetic-flux interlinkage command calculator 21 calculates the pre-compensation magnetic-flux interlinkage command value $\Psi o^*$ on the basis of the modulation factor coefficient, the angular velocity ω, and the DC bus voltage Vdcf.

The magnetic-flux interlinkage command limit calculator 22 calculates a magnetic-flux interlinkage command upper limit value $\Psi omax$ and a magnetic-flux interlinkage command lower limit value $\Psi omin$ on the basis of the torque-command value T*, the angular velocity ω, and the DC bus voltage Vdcf. The magnetic-flux interlinkage command upper limit value $\Psi omax$ (maximum magnetic-flux interlinkage value) is a maximum magnetic-flux interlinkage value that can be set for the torque-command value T* on the premise that field control is possible. Also, the magnetic-flux interlinkage command lower limit value $\Psi omin$ is a minimum magnetic-flux interlinkage value that can be set for the torque-command value T* on the premise that field control is possible.

For example, the magnetic-flux interlinkage command limit calculator 22 calculates the magnetic-flux interlinkage command upper limit value Ψomax on the basis of a magnetic-flux interlinkage limit map for field control that indicates a maximum value of the magnetic-flux interlinkage command value for each value of the torque-command value T*. Further, the magnetic-flux interlinkage command lower limit value Ψomin may use a predetermined value without calculation.

The magnetic-flux interlinkage command limit limiter 23 limits an upper limit value and a lower limit value of the pre-compensation magnetic-flux interlinkage command value Ψo* calculated by the magnetic-flux interlinkage command calculator 21 on the basis of the magnetic-flux interlinkage command upper limit value Ψomax and the magnetic-flux interlinkage command lower limit value Ψomin calculated by the magnetic-flux interlinkage command limit calculator 22. That is, when the pre-compensation magnetic-flux interlinkage command value Ψo* input from the magnetic-flux interlinkage command calculator 21 is larger than the magnetic-flux interlinkage command upper limit value Ψomax, the magnetic-flux interlinkage command limit limiter 23 replaces the value of the pre-compensation magnetic-flux interlinkage command value Ψo* with the value of the magnetic-flux interlinkage command upper limit value Ψomax and outputs it. Also, when the pre-compensation magnetic-flux interlinkage command value Ψo* input from the magnetic-flux interlinkage command calculator 21 is smaller than the magnetic-flux interlinkage command lower limit value Ψomin, the magnetic-flux interlinkage command limit limiter 23 replaces the value of the pre-compensation magnetic-flux interlinkage command value Ψo* with the value of the magnetic-flux interlinkage command lower limit value Ψomin and outputs it. Further, the pre-compensation magnetic-flux interlinkage command value Ψo* output from the magnetic-flux interlinkage command limit limiter 23 is referred to as a pre-compensation magnetic-flux interlinkage command value Ψoff*.

The magnetic-flux interlinkage calculator 24 calculates a magnetic-flux interlinkage feedback value Ψof (magnetic-flux feedback value) on the basis of the angular velocity ω (motor rotation speed). For example, a voltage command value V* (a d-axis voltage command value Vd* and a q-axis voltage command value Vq*) fed back from the current controller 15 shown in FIG. 2 is input to the magnetic-flux interlinkage calculator 24. The magnetic-flux interlinkage calculator 24 calculates the magnetic-flux interlinkage feedback value Ψof on the basis of the angular velocity ω indicating the present motor rotation speed input from the angular velocity calculator 14 and the present voltage command value V* input from the current controller 15. Further, the magnetic-flux interlinkage calculator 24 need only calculate the magnetic-flux interlinkage feedback value Ψof on the basis of a state quantity of the motor M. That is, the magnetic-flux interlinkage calculator 24 may calculate the magnetic-flux interlinkage feedback value Ψof on the basis of state quantities of the motor M other than the motor rotation speed.

The PI controller 25 calculates the magnetic-flux compensation value dΨobuf* on the basis of a deviation Ψoerr between the pre-compensation magnetic-flux interlinkage command value Ψoff* and the magnetic-flux interlinkage feedback value Ψof. The deviation Ψoerr obtained by the subtractor 28 is input to the PI controller 25. The subtractor 28 calculates the deviation Ψoerr by subtracting the magnetic-flux interlinkage feedback value Ψof input through a low-pass filter (LPF) from the pre-compensation magnetic-flux interlinkage command value Ψoff* input through a low-pass filter (LPF).

The PI controller 25 calculates the magnetic-flux compensation value dΨobuf* by adding a value obtained by multiplying the deviation Ψoerr by a proportional gain Kp and a value obtained by multiplying the deviation Ψoerr by an integral gain Ki and then integrating the result. In this way, the PI controller 25 calculates the magnetic-flux compensation value dΨobuf* on the basis of the calculation using the proportional gain Kp and the calculation using the integral gain Ki.

Further, feedback type anti-windup processing may be performed so that the integral term is not saturated. In this case, a value obtained by subtracting a magnetic-flux compensation value dΨo* to be described later output from the magnetic-flux interlinkage compensation limit limiter 27 from the pre-compensation magnetic-flux interlinkage command value Ψoff* output from the PI controller 25 is obtained. Also, a calculation in which a value obtained by multiplying the above-described value by a reciprocal number of the proportional gain Kp (anti-windup gain Kw) used in the PI controller 25 is subtracted from the deviation Ψoerr, and then multiplied by the integral gain Ki as described above is performed.

The proportional gain Kp, the integral gain Ki, and the anti-windup gain Kw used in the PI controller 25 are control gains for calculating the magnetic-flux compensation value dΨo*. That is, the PI controller 25 calculates the magnetic-flux compensation value dΨo* using the control gains on the basis of the deviation Ψoerr between the pre-compensation magnetic-flux interlinkage command value Ψoff* and the magnetic-flux interlinkage feedback value Ψof. Further, the proportional gain Kp, the integral gain Ki, and the anti-windup gain Kw used in the PI controller 25 are input from the control-gain changer 30.

The magnetic-flux interlinkage compensation limit calculator 26 calculates a limit value used in the magnetic-flux interlinkage compensation limit limiter 27. Here, the magnetic-flux interlinkage compensation limit limiter 27 calculates an upper limit value dΨomax that limits an upper limit value of the magnetic-flux compensation value dΨobuf*. The calculated upper limit value dΨomax is supplied to the magnetic-flux interlinkage compensation limit limiter 27. Also, the magnetic-flux interlinkage compensation limit calculator 26 calculates a lower limit value dΨomin that limits a lower limit value of the magnetic-flux compensation value dΨobuf*. The calculated lower limit value dΨomin is supplied to the magnetic-flux interlinkage compensation limit limiter 27.

For example, the magnetic-flux interlinkage compensation limit calculator 26 calculates the upper limit value dΨomax and the lower limit value dΨomin on the basis of the pre-compensation magnetic-flux interlinkage command value Ψo* input from the magnetic-flux interlinkage command calculator 21 and the magnetic-flux interlinkage command upper limit value Ψomax input from the magnetic-flux interlinkage command limit calculator 22.

Further, the magnetic-flux interlinkage compensation limit calculator 26 may calculate the upper limit value dΨomax and the lower limit value dΨomin using the pre-compensation magnetic-flux interlinkage command value Ψoff* output from the magnetic-flux interlinkage command limit limiter 23 instead of the pre-compensation magnetic-flux interlinkage command value Ψo*. Also, the upper limit value dΨomax and the lower limit value dΨomin may be calculated using the pre-compensation magnetic-flux interlinkage command value Ψo* and the pre-compensation magnetic-flux interlinkage command value Ψoff*.

The magnetic-flux interlinkage compensation limit limiter 27 limits the upper limit value and the lower limit value of the magnetic-flux compensation value dΨobuf* on the basis of the limit values. Here, the magnetic-flux interlinkage compensation limit limiter 27 limits the upper limit value and the lower limit value of the magnetic-flux compensation value dΨobuf* on the basis of the upper limit value dΨomax and the lower limit value dΨomin input from the magnetic-flux interlinkage compensation limit calculator 26.

That is, when the magnetic-flux compensation value dΨobuf* input from the PI controller 25 is larger than the upper limit value dΨomax, the magnetic-flux interlinkage compensation limit limiter 27 replaces a value of the magnetic-flux compensation value dΨobuf* with the upper limit value dΨomax. Also, when the magnetic-flux compensation value dΨobuf* input from the PI controller 25 is smaller than the lower limit value dΨomin, the magnetic-flux interlinkage compensation limit limiter 27 replaces the value of the magnetic-flux compensation value dΨobuf* with the lower limit value dΨomin. Further, the magnetic-flux compensation value dΨobuf* output from the magnetic-flux interlinkage compensation limit limiter 27 is referred to as the magnetic-flux compensation value dΨo*.

As described above, the subtractor 28 calculates the deviation Ψoerr by subtracting the magnetic-flux interlinkage feedback value Ψof from the pre-compensation magnetic-flux interlinkage command value Ψoff*. The adder 29 (magnetic-flux command value calculator) adds the pre-compensation magnetic-flux interlinkage command value Ψoff* and the magnetic-flux compensation value dΨo* to calculate and output a magnetic-flux command value Ψocmp*. That is, the adder 29 calculates the magnetic-flux command value Ψocmp* from the pre-compensation magnetic-flux interlinkage command value Ψoff* on the basis of the magnetic-flux compensation value dΨo*.

Further, a configuration in which the magnetic-flux interlinkage command limit calculator 22, the magnetic-flux interlinkage command limit limiter 23, the magnetic-flux interlinkage compensation limit calculator 26, and the magnetic-flux interlinkage compensation limit limiter 27 are not provided is also possible. In such a case, the pre-compensation magnetic-flux interlinkage command value Ψo* output from the magnetic-flux interlinkage command calculator 21 is input to the subtractor 28 and the adder 29. Also, the magnetic-flux compensation value dΨobuf* output from the PI controller 25 is input to the adder 29.

The control-gain changer 30 changes the control gains used by the PI controller 25 according to the state quantity of the motor M. That is, the control-gain changer 30 changes the proportional gain Kp, the integral gain Ki, and the anti-windup gain Kw according to the state quantity of the motor M. In the present embodiment, the control-gain changer 30 changes the control gains according to the motor rotation speed (rotation speed of the motor M). That is, in the present embodiment, the state quantity of the motor M used by the control-gain changer 30 is the motor rotation speed.

Figure 4:
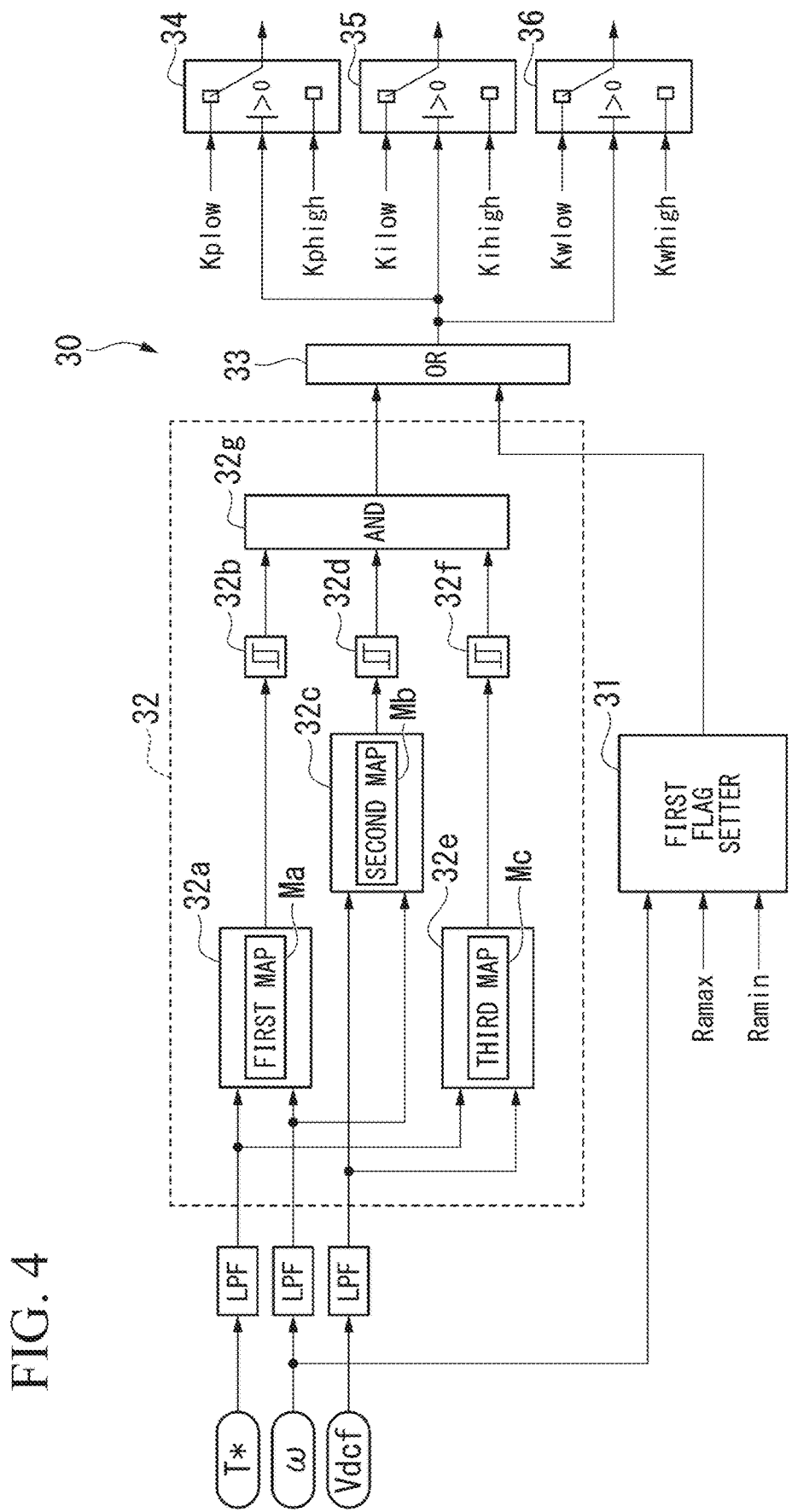
FIG. 4 is a block diagram of a control-gain changer of the control device in one embodiment of the present invention.

FIG. 4 is a block diagram of the control-gain changer 30. As shown in FIG. 4, the control-gain changer 30 includes a first flag setter 31, a second flag setter 32, an OR circuit 33, a proportional gain setter 34, an integral gain setter 35, and an anti-windup gain setter 36.

In control of the motor M, a range (a setting range of a current operating point) of a d-axis current value (id) and a q-axis current value (iq) needs to be limited within a range of a current limit circle and a voltage limit circle (magnetic-flux limit circle) drawn on the id-iq plane. Therefore, in a case in which the current operating point reaches a magnetic-flux limit (an edge of the magnetic-flux limit circle) or the like, field-weakening control is performed to weaken a force of the magnetic field. A motor rotation speed at which such field-weakening control is necessary is clarified in advance for each type of the motor M through experiments and simulations. Here, a range of the motor rotation speed, at which the field-weakening control is required, set for each type of the motor M is referred to as a first rotation speed range Ra. For example, as shown in FIG. 4, an upper limit value Ramax and a lower limit value Ramin of the first rotation speed range Ra are input to the first flag setter 31 from the outside. Also, the first flag setter 31 stores the upper limit value Ramax and the lower limit value Ramin in advance.

The first flag setter 31 sets a switching flag on the basis of a threshold value so that a value of the switching flag is "1" when it is determined to be a motor rotation speed at which the field-weakening control is required, and the value of the switching flag is "0" when it is determined to be a motor rotation speed at which the field-weakening control is not necessary.

The threshold value used in the first flag setter 31 is set to a value obtained by adding hysteresis to the upper limit value Ramax and the lower limit value Ramin. When the motor rotation speed increases and exceeds an upper limit value of the hysteresis set to the lower limit value Ramin, the first flag setter 31 switches the value of the switching flag from "0" to "1". Also, when the motor rotation speed decreases and exceeds a lower limit value of the hysteresis set to the lower limit value Ramin, the first flag setter 31 switches the value of the switching flag from "1" to "0". Also, when the motor rotation speed increases and exceeds an upper limit value of the hysteresis set to the upper limit value Ramax, the first flag setter 31 switches the value of the switching flag from "1" to "0". Also, when the motor rotation speed decreases and exceeds a lower limit value of the hysteresis set to the upper limit value Ramax, the first flag setter 31 switches the value of the switching flag from "0" to "1". In this way, in the first flag setter 31, the threshold value for determining whether or not the field-weakening control is to be performed has hysteresis.

The first flag setter 31 calculates the motor rotation speed from the angular velocity ω and determines whether or not the motor rotation speed is a motor rotation speed at which the field-weakening control is required on the basis of the calculated motor rotation speed and the above-described threshold value with hysteresis. As a result, the first flag setter 31 sets the value of the switching flag to "1" when it is determined to be a motor rotation speed at which the field-weakening control is required and sets the value of the switching flag to "0" when it is determined to be not a motor rotation speed at which the field-weakening control is required. Further, a motor rotation speed calculated outside may be input to the first flag setter 31.

Further, the first flag setter 31 may store the above-described threshold value in advance. In this case, it is not necessary to input the upper limit value Ramax and the lower limit value Ramin to the first flag setter 31. Also, in this case, the first flag setter 31 does not need to store the upper limit value Ramax and the lower limit value Ramin.

The second flag setter 32 determines whether or not the field-weakening control is to be performed on the basis of the motor rotation speed, the torque-command value T*, and the DC bus voltage Vdcf. Depending on types of vehicle, the field-weakening control of the motor M may be required even if the motor rotation speed is different from the above-described first rotation speed range Ra. Therefore, in the second flag setter 32, even if the motor rotation speed is different from the first rotation speed range Ra, the value of the switching flag can be switched from "0" to "1" as necessary.

For example, the second flag setter 32 stores a first map Ma indicating a relationship between the motor rotation speed and the torque-command value T*. The first map Ma is a map in which a value thereof is set to "1" that indicates condition matching in a case in which the relationship between the motor rotation speed and the torque-command value T* should switch the value of the switching flag from "0" to "1," and a value thereof in other cases is set to "0" that indicates condition non-matching. The second flag setter 32 includes a condition matching ratio outputter 32a that calculates and outputs an average value (a ratio of condition matching in the relationship between the motor rotation speed and the torque-command value T*) for a certain period of time using the first map Ma. The torque-command value T* is input to the condition matching ratio outputter 32a from the outside through the low-pass filter. Also, the condition matching ratio outputter 32a calculates the motor rotation speed using the angular velocity ω input from the outside through the low-pass filter. Further, a motor rotation speed calculated outside may be input to the condition matching ratio outputter 32a.

Further, the second flag setter 32 includes a condition matching flag setter 32b that sets a value of a condition matching flag on the basis of the output value of the condition matching ratio outputter 32a and the threshold value with hysteresis. For example, the condition matching flag setter 32b switches the value of the condition matching flag from "0" to "1" when the output value of the condition matching ratio outputter 32a is 0.9 or higher and switches the value of the condition matching flag from "1" to "0" when the output value of the condition matching ratio outputter 32a is 0.7 or lower.

Also, for example, the second flag setter 32 stores a second map Mb that indicates a relationship between the motor rotation speed and the DC bus voltage Vdcf. The second map Mb is a map in which a value thereof is set to "1" that indicates condition matching in a case in which the relationship between the motor rotation speed and the DC bus voltage Vdcf should switch the value of the switching flag from "0" to "1," and a value thereof in other cases is set to "0" that indicates condition non-matching. The second flag setter 32 includes a condition matching ratio outputter 32c that calculates and outputs an average value (a ratio of condition matching in the relationship between the motor rotation speed and the DC bus voltage Vdcf) for a certain period of time using the second map Mb. The DC bus voltage Vdcf is input to the condition matching ratio outputter 32c from the outside through the low-pass filter. Also, the condition matching ratio outputter 32c calculates the motor rotation speed using the angular velocity ω input from the outside through the low-pass filter. Further, a motor rotation speed calculated outside may be input to the condition matching ratio outputter 32c.

Further, the second flag setter 32 includes a condition matching flag setter 32d that sets a value of the condition matching flag on the basis of the output value of the condition matching ratio outputter 32c and the threshold value with hysteresis. For example, the condition matching flag setter 32d switches the value of the condition matching flag from "0" to "1" when the output value of the condition matching ratio outputter 32c is 0.9 or higher and switches the value of the condition matching flag from "1" to "0" when the output value of the condition matching ratio outputter 32c is 0.7 or lower.

Also, for example, the second flag setter 32 stores a third map Mc that indicates a relationship between the torque-command value T* and the DC bus voltage Vdcf. The third map Mc is a map in which a value thereof is set to "1" that indicates condition matching in a case in which the relationship between the torque-command value T* and the DC bus voltage Vdcf should switch the value of the switching flag from "0" to "1," and a value thereof in other cases is set to "0" that indicates condition non-matching. The second flag setter 32 includes a condition matching ratio outputter 32e that calculates and outputs an average value (a ratio of condition matching in the relationship between the torque-command value T* and the DC bus voltage Vdcf) for a certain period of time using the third map Mc. The torque-command value T* and the DC bus voltage Vdcf are input to the condition matching ratio outputter 32e from the outside through the low-pass filter.

Further, the second flag setter 32 includes a condition matching flag setter 32f that sets a value of the condition matching flag on the basis of the output value of the condition matching ratio outputter 32e and the threshold value with hysteresis. For example, the condition matching flag setter 32f switches the value of the condition matching flag from "0" to "1" when the output value of the condition matching ratio outputter 32e is 0.9 or higher and switches the value of the condition matching flag from "1" to "0" when the output value of the condition matching ratio outputter 32e is 0.7 or lower.

Also, the second flag setter 32 includes a switching flag determiner 32g. The switching flag determiner 32g is an AND circuit that sets the value of the switching flag to "1" when the value of the condition matching flag input from the condition matching flag setter 32b, the value of the condition matching flag input from the condition matching flag setter 32d, and the value of the condition matching flag input from the condition matching flag setter 32f are all "1".

The OR circuit 33 outputs "1" as the value of the switching flag when either the value of the switching flag input from the first flag setter 31 or the value of the switching flag input from the second flag setter 32 is "1". Also, the OR circuit 33 outputs "0" as the value of the switching flag when both the value of the switching flag input from the first flag setter 31 and the value of the switching flag input from the second flag setter 32 are "0".

The proportional gain setter 34 outputs a relatively high value of a proportional gain Kphigh when the value of the switching flag input from the OR circuit 33 is "0". On the other hand, the proportional gain setter 34 outputs a relatively low value of a proportional gain Kplow when the value of the switching flag input from the OR circuit 33 is "1". That is, when the field-weakening control is necessary (when the value of the switching flag is "1"), the control-gain changer 30 makes the proportional gain Kp smaller than when the field-weakening control is not necessary.

The integral gain setter 35 outputs a relatively high value of an integral gain Kihigh when the value of the switching flag input from the OR circuit 33 is "0". On the other hand, the integral gain setter 35 outputs a relatively low value of an integral gain Kilow when the value of the switching flag input from the OR circuit 33 is "1". That is, when the field-weakening control is necessary (when the value of the switching flag is "1"), the control-gain changer 30 makes the integral gain Ki smaller than when the field-weakening control is not necessary.

The anti-windup gain setter 36 outputs a relatively high value of an anti-windup gain Kwhigh when the value of the switching flag input from the OR circuit 33 is "0". The anti-windup gain Kwhigh is a reciprocal number of the proportional gain Kphigh. On the other hand, the anti-windup gain setter 36 outputs a relatively low value of an anti-windup gain Kwlow when the value of the switching flag input from the OR circuit 33 is "1". That is, when the field-weakening control is necessary (when the value of the switching flag is "1"), the control-gain changer 30 makes the anti-windup gain Kw smaller than when the field-weakening control is not necessary.

In this way, in the present embodiment, the control-gain changer 30 lowers the control gain when the field-weakening control is performed compared with that when the field-weakening control is not performed. Also, the control-gain changer 30 obtains a motor rotation speed as the state quantity of the motor M, and, on the basis of the motor rotation speed, determines whether or not the motor rotation speed is a motor rotation speed at which the field-weakening control is required.

In the magnetic-flux command value generator 20 configured as described above, the torque-command value T*, the angular velocity ω, and the DC bus voltage Vdcf are input to the magnetic-flux interlinkage command calculator 21. In the magnetic-flux interlinkage command calculator 21, the pre-compensation magnetic-flux interlinkage command value Ψo* is obtained on the basis of the torque-command value T*, the angular velocity ω, and the DC bus voltage Vdcf.

On the other hand, the torque-command value T*, the angular velocity ω, and the DC bus voltage Vdcf are also input to the magnetic-flux interlinkage command limit calculator 22. In the magnetic-flux interlinkage command limit calculator 22, the magnetic-flux interlinkage command upper limit value Ψomax and the magnetic-flux interlinkage command lower limit value Ψomin are obtained on the basis of the torque-command value T*, the angular velocity ω, and the DC bus voltage Vdcf.

The pre-compensation magnetic-flux interlinkage command value Ψo* is limited in its value on the basis of the magnetic-flux interlinkage command upper limit value Ψomax or the magnetic-flux interlinkage command lower limit value Ψomin as necessary in the magnetic-flux interlinkage command limit limiter 23 and is output as the pre-compensation magnetic-flux interlinkage command value Ψoff*.

Also, the angular velocity ω and the voltage command value V* are input to the magnetic-flux interlinkage calculator 24. In the magnetic-flux interlinkage calculator 24, the magnetic-flux interlinkage feedback value Ψof is calculated on the basis of the angular velocity ω and the voltage command value V*.

The pre-compensation magnetic-flux interlinkage command value Ψoff is input to the subtractor 28 through the low-pass filter. Also, the magnetic-flux interlinkage feedback value Ψof is input to the subtractor 28 through the low-pass filter. In the subtractor 28, the deviation Ψoerr is calculated by subtracting the magnetic-flux interlinkage feedback value Ψof from the pre-compensation magnetic-flux interlinkage command value Ψoff*.

The deviation Ψoerr is input to the PI controller 25. In the PI controller 25, the magnetic-flux compensation value dΨobuf* is calculated by adding a value obtained by multiplying the deviation Ψoerr by the proportional gain Kp and a value obtained by multiplying the deviation Ψoerr by the integral gain Ki and then integrating the result. Also, when feedback type anti-windup processing is performed, the magnetic-flux compensation value dΨobuf* is calculated by performing a calculation in which a value in which the magnetic-flux compensation value dΨo* is subtracted from the pre-compensation magnetic-flux interlinkage command value Ψoff* is obtained, a value obtained by multiplying the above-described value by the anti-windup gain Kw is subtracted from the deviation Ψoerr, and then this is multiplied by the integral gain Ki as described above.

Also, in the present embodiment, the control gains (the proportional gain Kp, the integral gain Ki, and the anti-windup gain Kw) are set by the control-gain changer 30. As shown in FIG. 3, the torque-command value T*, the angular velocity ω, and the DC bus voltage Vdcf are input to the control-gain changer 30. For example, the control-gain changer 30 obtains the motor rotation speed on the basis of the angular velocity ω and determines whether or not the motor rotation speed is a rotation speed at which the field-weakening control is required. When the motor rotation speed is a rotation speed at which the field-weakening control is required, the control gain is changed to a lower control gain than that when the field-weakening control is not required.

On the other hand, the pre-compensation magnetic-flux interlinkage command value Ψo* output from the magnetic-flux interlinkage command calculator 21 and the magnetic-flux interlinkage command upper limit value Ψomax output from the magnetic-flux interlinkage command limit calculator 22 are input to the magnetic-flux interlinkage compensation limit calculator 26. In the magnetic-flux interlinkage compensation limit calculator 26, the upper limit value dΨomax that limits an upper limit value of the magnetic-flux compensation value dΨobuf* is calculated on the basis of the pre-compensation magnetic-flux interlinkage command value Ψo* and the magnetic-flux interlinkage command upper limit value Ψomax. Also, in the magnetic-flux interlinkage compensation limit calculator 26, the lower limit value dΨomin that limits a lower limit value of the magnetic-flux compensation value dΨobuf is calculated on the basis of the pre-compensation magnetic-flux interlinkage command value Ψo* and the magnetic-flux interlinkage command upper limit value Ψomax.

The magnetic-flux compensation value dΨobuf* output from the PI controller 25 is limited in its value on the basis of the upper limit value dΨomax or the lower limit value dΨomin as necessary in the magnetic-flux interlinkage compensation limit limiter 27 and is output as the magnetic-flux compensation value Ψo*.

The pre-compensation magnetic-flux interlinkage command value Ψoff* output from the magnetic-flux interlinkage command limit limiter 23 and the magnetic-flux compensation value Ψo* output from the magnetic-flux interlinkage compensation limit limiter 27 are input to the adder 29. In the adder 29, the pre-compensation magnetic-flux interlinkage command value Ψoff* and the magnetic-flux compensation value dΨo* are added to calculate the magnetic-flux command value Ψocmp*. The calculated magnetic-flux command value Ψocmp* is input to the current-command value generator 40 shown in FIG. 2. In the current-command value generator 40, the d-axis current-command value id* and the q-axis current-command value iq* are generated on the basis of the magnetic-flux command value Ψocmp*.

The current detector 12 shown in FIG. 2 detects a current value (hereinafter referred to as "U-phase current value") iu flowing through a coil of the U-phase in the motor M, a current value (hereinafter referred to as "V-phase current value") iv flowing through a coil of the V-phase in the motor M, and a current value (hereinafter referred to as "W-phase current value") iw flowing through a coil of the W-phase in the motor M from detection results of the current sensors 4. Then, the current detector 12 outputs the detected U-phase current value iu, V-phase current value iv, and W-phase current value iw to the three-phase/dq converter 13.

The three-phase/dq converter 13 converts the U-phase current value iu, the V-phase current value iv, and the W-phase current value iw acquired from the current detector 12 into the d-axis current value id and the q-axis current value iq of a dq coordinate system using an electrical angle θ acquired from the rotation angle sensor 5. The three-phase/dq converter 13 outputs the d-axis current value id and the q-axis current value iq to the current controller 15.

The angular velocity calculator 14 calculates the angular velocity ω on the basis of the electrical angle θ of the motor M output from the rotation angle sensor 5. The angular velocity calculator 14 outputs the calculated angular velocity ω to the current controller 15. The current controller 15 calculates the d-axis voltage command value Vd* on the basis of the d-axis current-command value id*. The current controller 15 calculates the q-axis voltage command value Vq* on the basis of the q-axis current-command value iq*. The current controller 15 outputs the d-axis voltage command value Vd* and the q-axis voltage command value Vq* to the dq/three-phase convertor 16.

The dq/three-phase convertor 16 acquires the electrical angle θ from the rotation angle sensor 5. The dq/three-phase convertor 16 acquires the d-axis voltage command value Vd* and the q-axis voltage command value Vq* from the current controller 15. The dq/three-phase convertor 16 converts the d-axis voltage command value Vd* and the q-axis voltage command value Vq* into a U-phase voltage command value Vu*, a V-phase voltage command value Vv*, and a W-phase voltage command value Vw*, which are voltage command values of the phases of the UVW phases in the motor M, using the electrical angle θ. Then, the dq/three-phase convertor 16 outputs the U-phase voltage command value Vu*, the V-phase voltage command value Vv*, and the W-phase voltage command value Vw* to the PWM controller 17. The U-phase voltage command value Vu*, the V-phase voltage command value Vv*, and the W-phase voltage command value Vw* are modulated waves and may be referred to as a "voltage command signal" when they do not need to be distinguished from each other.

The PWM controller 17 compares a carrier wave with a predetermined carrier frequency and the voltage command signal. Then, as a result of the comparison, the PWM controller 17 outputs the PWM signal to the power converter 2 by outputting a Hi level signal during a period when an amplitude of the voltage command signal is larger than that of the carrier wave and outputting a Lo level signal during a period when the amplitude of the voltage command signal is smaller than that of the carrier wave. The PWM controller 17 generates a PWM signal Du by comparing the carrier wave and the U-phase voltage command value Vu*, and outputs it to the power converter 2. The PWM controller 17 generates a PWM signal Dv by comparing the carrier wave and the V-phase voltage command value Vv*, and outputs it to the power converter 2. The PWM controller 17 generates a PWM signal Dw by comparing the carrier wave and the W-phase voltage command value Vw*, and outputs it to the power converter 2.

Rotation of the motor M is controlled when the power converter 2 is driven on the basis of the PWM signals (the PWM signal Du, the PWM signal Dv, and the PWM signal Dw described above) input from the PWM controller 17.

For example, when the field-weakening control is performed, it is ideal to operate the motor M such that the current operating point traces an equal torque line on the id-iq plane to maintain a specified modulation factor. However, a sensitivity to the control gain increases at the motor rotation speed at which the field-weakening control is performed. Therefore, if the control gain is set to a fixed value, operation amounts of the d-axis current-command value id* and the q-axis current-command value iq* for maintaining the specified modulation factor become large in a case in which the field-weakening control is performed. As a result, there is a likelihood that the q-axis current caused by a torque component will change significantly and torque hunting will occur. In contrast, the control device 1 of the present embodiment lowers the control gain when the field-weakening control is performed. Therefore, it is possible to suppress the torque hunting.

The control device 1 of the present embodiment as described above includes the magnetic-flux command value generator 20 and the current-command value generator 40. The magnetic-flux command value generator 20 generates the magnetic-flux command value Ψocmp* based on the torque-command value T*. The current-command value generator 40 generates the current-command values (the d-axis current-command value id* and the q-axis current-command value iq*) on the basis of the magnetic-flux command value Ψocmp*. Also, the magnetic-flux command value generator 20 includes the magnetic-flux interlinkage command calculator 21, the magnetic-flux interlinkage calculator 24, the PI controller 25, the adder 29, and the control-gain changer 30. The magnetic-flux interlinkage command calculator 21 calculates the pre-compensation magnetic-flux interlinkage command value Ψo* on the basis of the torque-command value T*. The magnetic-flux interlinkage calculator 24 calculates the magnetic-flux interlinkage feedback value Ψof on the basis of the state quantity of the motor. The PI controller 25 calculates the magnetic-flux compensation value dΨobuf* using the control gain on the basis of the deviation between the pre-compensation magnetic-flux interlinkage command value Ψo* and the magnetic-flux interlinkage feedback value Ψof. The adder 29 calculates the magnetic-flux command value Ψocmp* from the pre-compensation magnetic-flux interlinkage command value Ψo* on the basis of the magnetic-flux compensation value dΨobuf*. The control-gain changer 30 changes the control gain on the basis of the state quantity of the motor.

According to the control device 1 of the present embodiment, the control gain used by the PI controller 25 is changed on the basis of the state quantity of the motor. Therefore, according to the control device 1 of the present embodiment, when the motor M is controlled by magnetic-flux feedback control, it is possible to calculate the magnetic-flux command value Ψocmp* according to a change in state of the motor M.

Further, in the control device 1 of the present embodiment, the control-gain changer 30 lowers the control gain when the field-weakening control is performed compared with that when the field-weakening control is not performed. According to the control device 1 of the present embodiment as described above, it is possible to suppress a large change in the q-axis current caused by the torque component to suppress the torque hunting in the field-weakening control.

Also, in the control device 1 of the present embodiment, the motor rotation speed is used as the state quantity of the motor. Also, the control-gain changer 30 determines whether or not the field-weakening control is to be performed on the basis of the first rotation speed range Ra indicating a rotation speed range within which the field-weakening control set in advance is performed. That is, the control-gain changer 30 determines whether or not the field-weakening control is to be performed on the basis of the motor rotation speed. Therefore, it is possible to determine whether or not the field-weakening control is to be performed by a simple control.

Also, in the control device 1 of the present embodiment, when the rotation speed of the motor is outside of the first rotation speed range Ra, the control-gain changer 30 determines whether or not the field-weakening control is to be performed on the basis of the motor rotation speed, the torque-command value T*, and a voltage of a power supply connected to the motor (DC bus voltage Vdcf). According to the control device 1 of the present embodiment, the motor rotation speed at which the field-weakening control is to be performed changes depending on types of vehicle on which the motor M is mounted, and it is possible to suppress the torque hunting even when the field-weakening control is performed at a motor rotation speed that is outside of the above-described first rotation speed range Ra.

Also, in the control device 1 of the present embodiment, the threshold value for determining whether or not the field-weakening control is to be performed has hysteresis. Therefore, even if the motor rotation speed repeatedly increases and decreases in the vicinity of the threshold value, frequent changes in the value of the switching flag can be suppressed, and repeated changes in the control gain can be suppressed.

The preferred embodiments of the present invention have been described above with reference to the accompanying drawings, but the present invention is not limited to the above-described embodiments. Shapes, combinations, or the like of the respective constituent members illustrated in the above-described embodiments are merely examples, and various changes can be made on the basis of design requirements or the like without departing from the gist of the present invention.

For example, in the above-described embodiment, a configuration including the PI controller 25 has been described. However, it is also possible to employ a configuration that performs feedback control by including a controller that performs P control or a controller that performs PID control instead of the PI controller.

Also, in the above-described embodiment, the buck-boost converter 2a is a power circuit that is referred to as a so-called magnetically coupled interleaved chopper circuit. However, the present invention is not limited thereto. For example, a single chopper type converter or other boost type converters may be used.

Also, in the above-described embodiment, a configuration in which the motor M and the generator G are connected to the power converter 2 has been described. However, the present invention is not limited thereto. For example, a configuration in which the generator G is not connected to the power converter 2 or a configuration in which two or more motors M are connected to the power converter 2 may be employed.

DESCRIPTION OF REFERENCE NUMERALS

1 Control device (motor control device)
2 Power converter
20 Magnetic-flux command value generator
21 Magnetic-flux interlinkage command calculator (magnetic-flux command calculator)
22 Magnetic-flux interlinkage command limit calculator
23 Magnetic-flux interlinkage command limit limiter
24 Magnetic-flux interlinkage calculator (feedback-value calculator)
25 PI controller (magnetic-flux compensation value calculator)
26 Magnetic-flux interlinkage compensation limit calculator
27 Magnetic-flux interlinkage compensation limit limiter
28 Subtractor
29 Adder (magnetic-flux command value calculator)
30 Control-gain changer
40 Current-command value generator

What is claimed is:

1. A motor control device comprising:
a magnetic-flux command value generator configured to generate a magnetic-flux command value based on a torque-command value; and
a current-command value generator configured to generate a current-command value on the basis of the magnetic-flux command value, wherein
the magnetic-flux command value generator comprises:
a magnetic-flux command calculator configured to calculate a pre-compensation magnetic-flux command value on the basis of the torque-command value;
a feedback-value calculator configured to calculate a magnetic-flux feedback value on the basis of a state quantity of a motor;
a magnetic-flux compensation value calculator configured to calculate a magnetic-flux compensation value using a control gain on the basis of a deviation between the pre-compensation magnetic-flux command value and the magnetic-flux feedback value;
a magnetic-flux command value calculator configured to calculate the magnetic-flux command value from the pre-compensation magnetic-flux command value on the basis of the magnetic-flux compensation value; and
a control-gain changer configured to change the control gain on the basis of the state quantity.

2. The motor control device according to claim 1, wherein the control-gain changer is configured to lower the control gain when field-weakening control is performed compared with that when the field-weakening control is not performed.

3. The motor control device according to claim 2, wherein the state quantity is a rotation speed of the motor, and the control-gain changer is configured to determine whether or not the field-weakening control is to be performed on the basis of a first rotation speed range indicating a rotation speed range within which the field-weakening control set in advance is performed.

4. The motor control device according to claim 3, wherein the control-gain changer is configured to determine whether or not the field-weakening control is to be performed on the basis of the rotation speed, the torque-command value, and a voltage of a power supply connected to the motor when the rotation speed of the motor is outside of the first rotation speed range.

5. The motor control device according to claim 2, wherein a threshold value for determining whether or not the field-weakening control is to be performed has hysteresis.

* * * * *